United States Patent
Gandhi

(10) Patent No.: US 8,178,028 B2
(45) Date of Patent: May 15, 2012

(54) LASER PATTERNING OF NANOSTRUCTURE-FILMS

(75) Inventor: Shripal Gandhi, Palo Alto, CA (US)

(73) Assignee: Samsung Electronics Co., Ltd., Gyeonngi-do (KR)

(*) Notice: Subject to any disclaimer, the term of this patent is extended or adjusted under 35 U.S.C. 154(b) by 1326 days.

(21) Appl. No.: 11/741,407

(22) Filed: Apr. 27, 2007

(65) Prior Publication Data

US 2008/0128397 A1    Jun. 5, 2008

Related U.S. Application Data

(60) Provisional application No. 60/864,596, filed on Nov. 6, 2006.

(51) Int. Cl.
*B23K 26/36* (2006.01)
(52) U.S. Cl. ............. 264/400; 219/121.69; 977/889
(58) Field of Classification Search ............ 219/121.68, 219/121.69; 977/856, 889, 842, 844; 264/400
See application file for complete search history.

(56) References Cited

U.S. PATENT DOCUMENTS

| | | | |
|---|---|---|---|
| 6,229,114 B1* | 5/2001 | Andrews et al. | 219/121.72 |
| 7,692,116 B1* | 4/2010 | Holloway et al. | 219/121.86 |
| 2002/0090331 A1* | 7/2002 | Smalley et al. | 422/198 |
| 2004/0053432 A1* | 3/2004 | Liu et al. | 438/40 |
| 2004/0095050 A1* | 5/2004 | Liu et al. | 313/309 |
| 2004/0155017 A1* | 8/2004 | Hunt et al. | 219/121.69 |
| 2004/0227447 A1* | 11/2004 | Yaniv et al. | 313/309 |
| 2005/0142978 A1* | 6/2005 | Yotani et al. | 445/50 |
| 2006/0097430 A1* | 5/2006 | Xiaochun et al. | 219/121.72 |
| 2006/0213880 A1* | 9/2006 | Tanaka et al. | 219/121.69 |
| 2006/0290343 A1* | 12/2006 | Crafts et al. | 324/158.1 |
| 2007/0120095 A1* | 5/2007 | Gruner | 252/500 |
| 2007/0128905 A1* | 6/2007 | Speakman | 439/161 |
| 2007/0153353 A1* | 7/2007 | Gruner | 359/245 |
| 2007/0215841 A1* | 9/2007 | Ford et al. | 252/503 |
| 2007/0246689 A1* | 10/2007 | Ge et al. | 252/500 |
| 2007/0248758 A1* | 10/2007 | Ward et al. | 977/842 |
| 2008/0083706 A1* | 4/2008 | Kirmeier | 219/121.68 |
| 2008/0191606 A1* | 8/2008 | Geohegan et al. | 313/501 |
| 2010/0003809 A1* | 1/2010 | Huang | 438/795 |
| 2011/0233816 A1* | 9/2011 | Liu | 977/842 |

FOREIGN PATENT DOCUMENTS

JP        2004-362919 A   * 12/2004

OTHER PUBLICATIONS

Dharap et al., "Nanotube film based on single-wall carbon nanotubers for strain sensing", Jan. 2004, Institute of Physics Publishing, Nanotechnology vol. 15, pp. 379-382.*
Machine translation of Japan Patent document No. 2004-362,919, Aug. 2011.*

* cited by examiner

*Primary Examiner* — Geoffrey S Evans
(74) *Attorney, Agent, or Firm* — Harness, Dickey & Pierce P.L.C.

(57) ABSTRACT

A novel nanostructure-film patterning method is discussed, wherein a laser is employed to etch a nanostructure-film. The laser may be a solid state UV laser, and the nanostructure-film may be patterned while mounted and moving on a roll-to-roll apparatus.

16 Claims, 4 Drawing Sheets

FIG. 1
FIG. 1A
c.w. laser
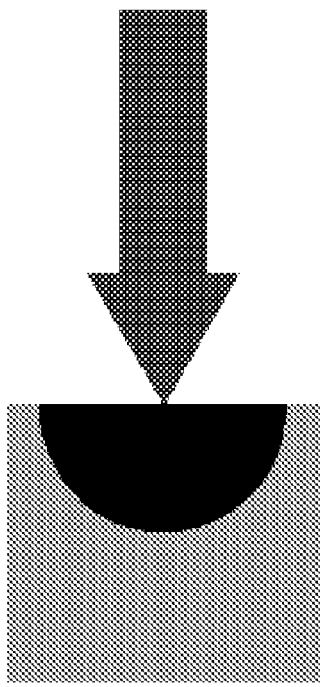
FIG. 1B
ns laser
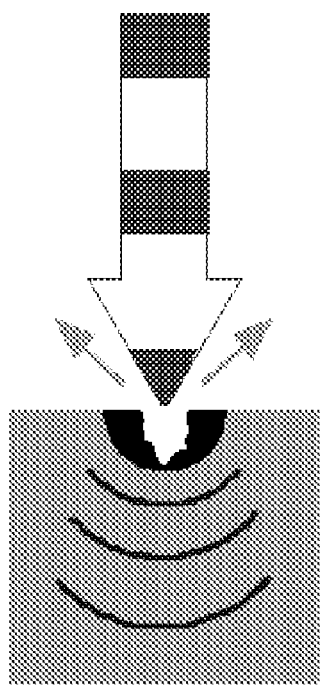
Shock waves
FIG. 1C
ps/fs laser
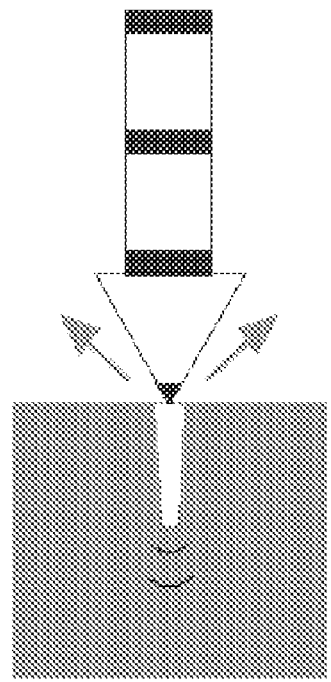

LASER PATTERNING OF NANOSTRUCTURE-FILMS

This application claims priority to U.S. Provisional Patent Application No. 60/864,596, filed Nov. 6, 2006 and entitled "Laser Ablation of Nanostructure-Films," which is hereby incorporated herein by reference.

FIELD OF THE INVENTION

The present invention relates in general to nanostructure-films, and more particularly to patterning methods thereof employing lasers.

BACKGROUND

Nanostructure-films, such as those comprising interconnected networks of nanotubes, nanowires, nanoparticles and/or graphene flakes, have attracted a great deal of recent attention due to their exceptional material properties. Specifically, films comprising carbon nanotubes network(s) can exhibit extraordinary strength and unique electrical properties, as well as efficient heat conduction. These novel properties make them potentially useful in a wide variety of applications in nanotechnology, electronics, optics and other fields of materials science.

For example, transparent conducting films comprising interconnected network(s) of carbon nanotubes (e.g., SWNTs and/or FWNTs) may soon replace indium-tin-oxide (ITO) as an industry-standard transparent electrode material. Applications for such a material include, but are not limited to, touch screens (e.g., analog, resistive, improved analog, X/Y matrix, capacitive), flexible displays (e.g., electro-phoretics, electro-luminescence, electrochromatic), rigid displays (e.g., liquid crystal (LCD), plasma (PDP), organic light emitting diode (LED)), solar cells (e.g., silicon (amorphous, protocrystalline, nanocrystalline), cadmium telluride (CdTe), copper indium gallium selenide (CIGS), copper indium selenide (CIS), gallium arsenide (GaAs), light absorbing dyes, quantum dots, organic semiconductors (e.g., polymers, small-molecule compounds)), fiber-optic communications (e.g., electro-optic and opto-electric modulators) and microfluidics (e.g. electrowetting on dielectric (EWOD)).

Many transparent electrode (e.g., displays) and other applications (e.g., thin-film transistors (TFTs), RFID tags) will require the nanostructure-films used therein to be patterned. Currently, nanostructure-film patterning is accomplished using photolithography and conventional chemical etching, lift-off methods (e.g., using a photoresist coating or printer toner), transfer stamping (e.g. using a PDMS stamp) and/or printing (e.g., inkjet). However, alternate techniques will be needed to meet the myriad of application-specific patterning requirements sure to arise in this burgeoning field (e.g., high resolution, high-throughput, high-selectivity, low impact).

SUMMARY OF INVENTION

A novel nanostructure-film patterning method according to a preferred embodiment of the present invention comprises using a laser to etch patterns in a nanostructure-film.

In further preferred embodiments of the present invention, the nanostructure-film may be mounted on a roll-to-roll apparatus when etched. As compared to a batch process, which handles only one component at a time, a roll-to-roll process represents a dramatic deviation from current manufacturing practices, and can substantially reduce capital equipment and part costs, while significantly increasing throughput. Preferably, the nanostructure-film is etched while moving at a rate of at least about 1-2 meters/second to increase throughput.

The laser used is preferably a solid state UV laser. Such a laser has proven effective in patterning nanostructure-films in single passes and at resolutions below 5-10 microns, even at power levels as low as 17 watts. Alternatively, gas lasers, chemical lasers, excimer lasers, other solid state lasers, fiber-hosted lasers, semiconductor lasers, dye lasers and/or free electron lasers may be employed.

Nanostructure-films patterned according to methods of the present invention are preferably substantially electrically conductive or substantially electrically semiconducting. Such films may further be optically transparent. In preferred embodiments, the nanostructure-films comprise interconnected network(s) of carbon nanotubes.

Other features and advantages of the invention will be apparent from the accompanying drawings and from the detailed description. One or more of the above-disclosed embodiments, in addition to certain alternatives, are provided in further detail below with reference to the attached figures. The invention is not limited to any particular embodiment disclosed.

BRIEF DESCRIPTION OF THE DRAWINGS

The invention is better understood from reading the following detailed description of the preferred embodiments, with reference to the accompanying figures in which:

FIG. 1 is a schematic representation of laser etching with different pulse durations;

Features, elements, and aspects of the invention that are referenced by the same numerals in different figures represent the same, equivalent, or similar features, elements, or aspects in accordance with one or more embodiments of the system.

DETAILED DESCRIPTION OF THE PREFERRED EMBODIMENTS

Referring to FIG. 1, a patterning method according to a preferred embodiment of the present invention comprises etching a nanostructure-film using a laser. The laser used is preferably a solid state UV laser (e.g., green). Such a laser has proven effective in patterning nanostructure-films in single passes and at resolutions below 5-10 microns, even at power levels as low as 17 watts. Alternatively, excimer lasers, other solid state lasers, gas lasers, chemical lasers, fiber-hosted lasers, semiconductor lasers, dye lasers and/or free electron lasers may be employed.

Etching can be further controlled by varying laser pulse duration (e.g., from milliseconds to femtoseconds) and/or fluxes. For example, at a low laser flux the nanostructure-film absorbs laser energy and evaporates/sublimates, while at high laser flux the nanostructure-film is typically converted to plasma.

Preferably, ultrashort (picosecond, femtosecond and/or nanosecond) pulses are used to etch the nanostructure-film material (see FIG. 1B, 1C). Due to their high peak intensities, such pulses can effectively etch nanostructure films through the rapid creation of plasma, which absorbs incident laser energy resulting in direct vaporization from the target surface, with often negligible collateral heating and shock-wave damage (which can be key in preserving the properties of the remaining patterned nanostructure-film).

While laser etching is preferably performed with a pulsed laser, nanostructure-films may also be patterned with continuous wave and/or long pulse lasers (e.g., at high intensity). Continuous wave (see FIG. 1A) and long pulse (nanosecond) (see FIG. 1B) laser ablation are primarily used to heat a target material through the liquid phase to the vapor phase. This technique can be used to pattern nanostructure-films, according to an additional embodiment of the present invention, where, for example, a nanostructure solution is deposited on a substrate and laser ablation is used to selectively remove solvent from the solution, and thereby produce a patterned nanostructure-film.

Figure 2:
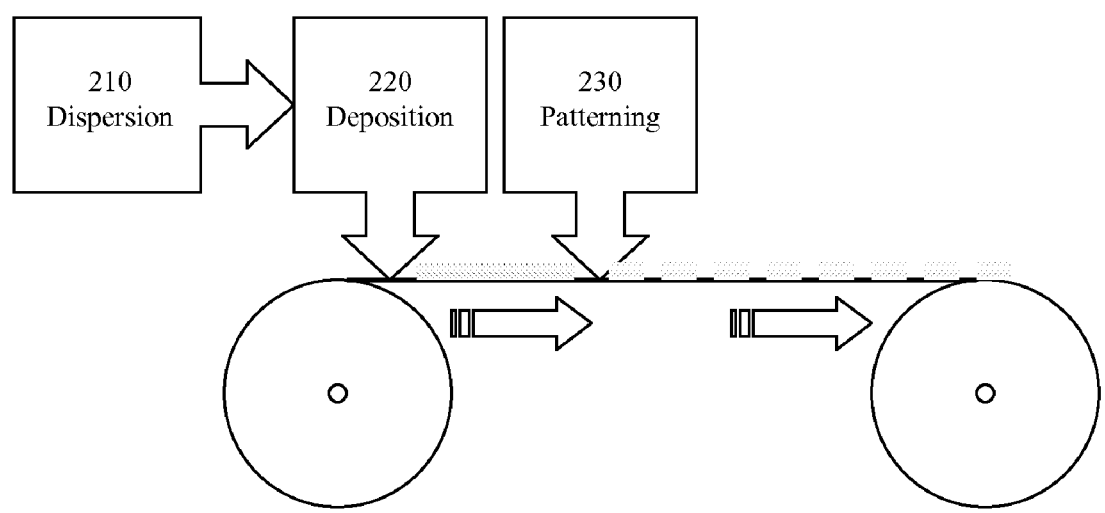
FIG. 2 is a schematic representation of a nanostructure film deposition method according to an embodiment of the present invention.

Referring to FIG. 2, in further preferred embodiments of the present invention, the nanostructure-film may be mounted on a roll-to-roll apparatus when etched. As compared to a batch process, which handles only one component at a time, a roll-to-roll process represents a dramatic deviation from current manufacturing practices, and can reduce capital equipment and part costs, while significantly increasing throughput. Preferably, the nanostructure-film is etched while moving at a rate of at least about 1-2 meters/second to maximize throughput.

Figure 4A:
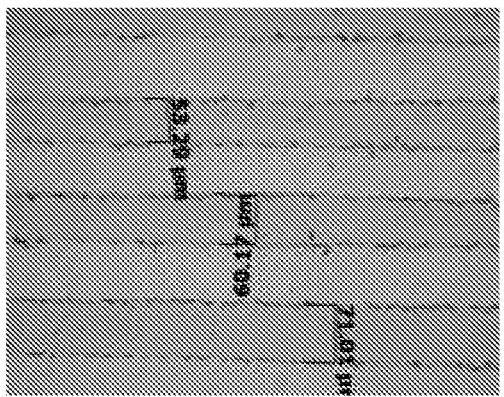
FIGS. 4A-4C are microscope images of laser-etched patterns in nanostructure films according to embodiments of the present invention.
Figure 4B:
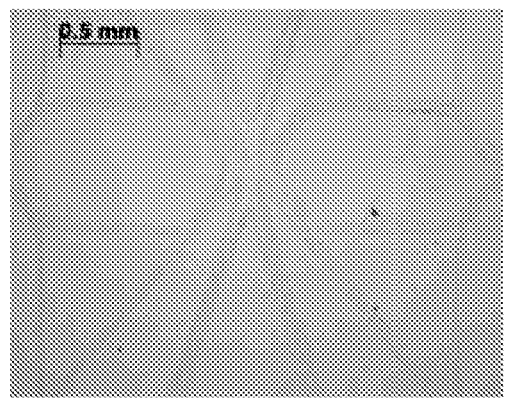
Figure 4C:

In one exemplary embodiment, carbon nanotubes were first dispersed in solution 210 (water-soluble FWNT powder dissolved in DI water with a surfactant (SDS) and sonicated). The resulting dispersion was then deposited 220 onto a flexible plastic substrate (PET) using a slot-die coater, and patterned 230 using a solid state UV laser, said substrate moving on a roll-to-roll apparatus from a roll of uncoated substrate to a roll of coated substrate at a rate of 2 meters/second. The laser provided an etch resolution of less than 5-10 microns in the FWNT films in single passes, even at power levels as low as 17 watts (see FIGS. 4A-4C). The FWNT film patterned in this run was of a quality suitable for optoelectronic applications (e.g., with a sheet resistance of less than about 500 ohms/square and an optical transmission of at least 80%).

As mentioned above, alternate lasers and/or nanostructures may be employed. Similarly, other applicable nanostructure deposition methods include, but are not limited to, spray-coating, dip-coating, drop-coating and/or casting, roll-coating, gravure printing, transfer-stamping and/or inkjet printing. A Meyer rod may also be used to squeeze the solutions for a more uniform nanostructure solution coating.

The substrate is preferably flexible (e.g., polyethylene terephthalate (PET), polyethylene naphthalate (PEN), polycarbonate (PC), polyethersulfone (PES) and/or Arton) and therefore compatible with roll-to-roll processing. Nanostructure-films generally have high mechanical flexibility (especially when passivated, encapsulated and/or coupled with a polymer binder), which enables them to be processed using roll-to-roll techniques (key for large scale fabrication) and distinguishes them from many other conductive films.

The depth over which the laser energy is absorbed, and thus the amount of nanostructure-film material removed by a single laser pulse, may depend on the material's optical properties and the laser wavelength. In a preferred embodiment of the present invention, the nanostructure film comprises carbon nanotubes (e.g., SWNTs, FWNTs), which generally exhibit relatively steady absorption across a broad range of the spectrum (and can therefore accommodate a potentially wide variety of lasers). In experimental embodiments, lasers having wavelengths of 1.06, 0.532, and 0.355 microns (infrared, green and ultraviolet respectively) were tested.

Figure 3:
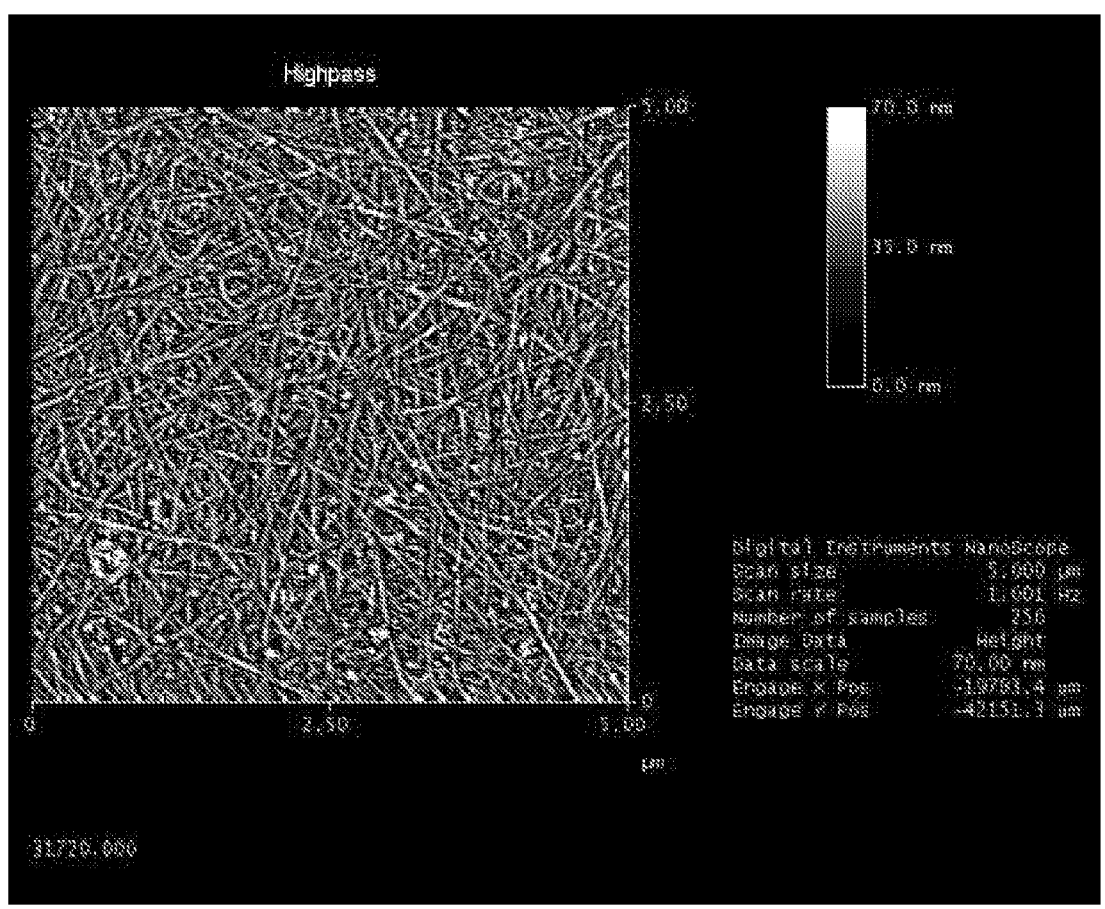
FIG. 3 is an atomic force microscope (AFM) image of a nanostructure-film according to an embodiment of the present invention.

Referring to FIG. 3, nanostructure-films according to embodiments of the present invention preferably comprise interconnected network(s) of carbon nanotubes. Such network(s) are preferably substantially electrically conductive or substantially electrically semiconducting. Such films may additionally be optically transparent. As used herein, a film is said to be "transparent" when the layer or layers permit at least 50% of the ambient electromagnetic radiation in relevant wavelengths to be transmitted through the layer or layers. Similarly, a film is said to be "conductive" or "semiconducting" if the density of electrically conductive or semiconducting elements therein, respectively, is above a percolation threshold.

The present invention has been described above with reference to preferred features and embodiments. Those skilled in the art will recognize, however, that changes and modifications may be made in these preferred embodiments without departing from the scope of the present invention. These and various other adaptations and combinations of the embodiments disclosed are within the scope of the invention.

What is claimed is:

1. A method for patterning a nanostructure-film, comprising:
   etching a nanostructure-film with a laser,
   wherein the nanostructure-film includes at least one interconnected network of carbon nanotubes.

2. The method of claim 1, wherein the etching a nanostructure-film includes etching the nanostructure-film on a roll-to-roll apparatus moving at a rate of at least 1 meter/second.

3. The method of claim 2, wherein the laser is a solid state UV laser.

4. The method of claim 3, wherein the etching a nanostructure-film includes etching features of less than about 10 microns into the nanostructure-film.

5. The method of claim 3, wherein an etch-resolution in the nanostructure-film is less than about 10 microns.

6. The method of claim 5, wherein the nanostructure-film is substantially electrically semiconducting.

7. The method of claim 5, wherein the nanostructure-film is substantially electrically conductive.

8. The method of claim 7, wherein the nanostructure-film is on a flexible substrate.

9. The method of claim 8, wherein the nanostructure-film is optically transparent.

10. The method of claim 9, wherein
    the carbon nanotubes are few-walled carbon nanotubes,
    the flexible substrate is a plastic, and
    the nanostructure-film is of a quality suitable for optoelectronic applications.

11. The method of claim 10, wherein the etching a nanostructure film includes firing the laser in picosecond pulses.

12. A method of etching a nanotube network, comprising:
    etching a nanotube network with a solid state UV laser.

13. The method of claim 12, wherein the etching a nanotube network includes etching the nanotube network on a roll-to-roll apparatus moving at a rate of at least 2 meters/second.

14. The method of claim 13, wherein the etching a nanotube network includes operating the solid state UV laser at a power of less than about 17 watts.

15. The method of claim 14, wherein an etch resolution in the nanotube network is less than about 5 microns.

16. The method of claim 14, wherein the etching a nanotube network includes etching features of less than about 10 microns into the nanotube network.

* * * * *